Figure 1:
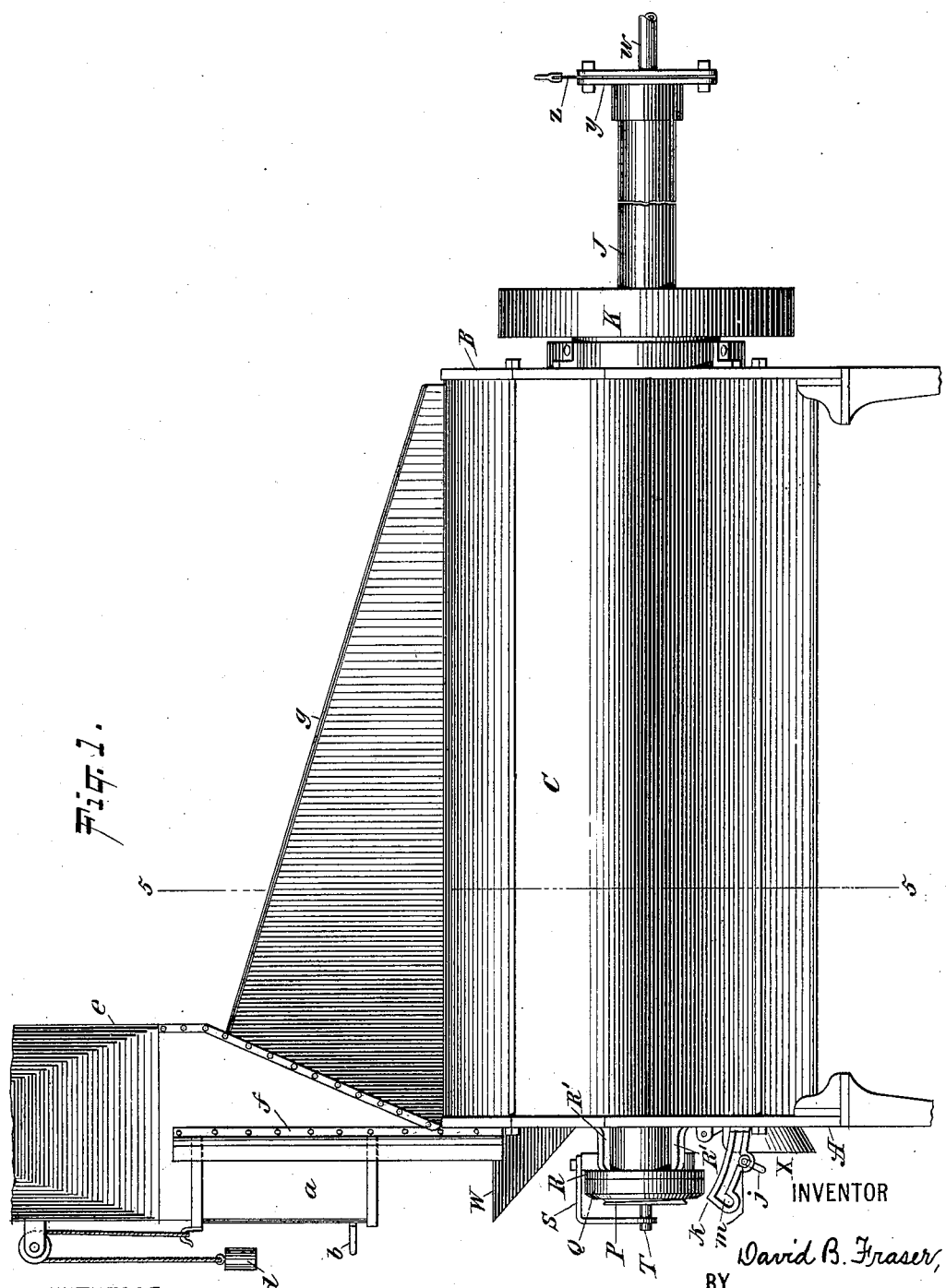

No. 627,993. Patented July 4, 1899.
D. B. FRASER.
COFFEE ROASTER.
(Application filed Apr. 22, 1898.)
(No Model.) 4 Sheets—Sheet 1.

WITNESSES:
William P. Goebel.
E. Jos. Belknap.

INVENTOR
David B. Fraser,
BY
Chas. E. Gill
ATTORNEY.

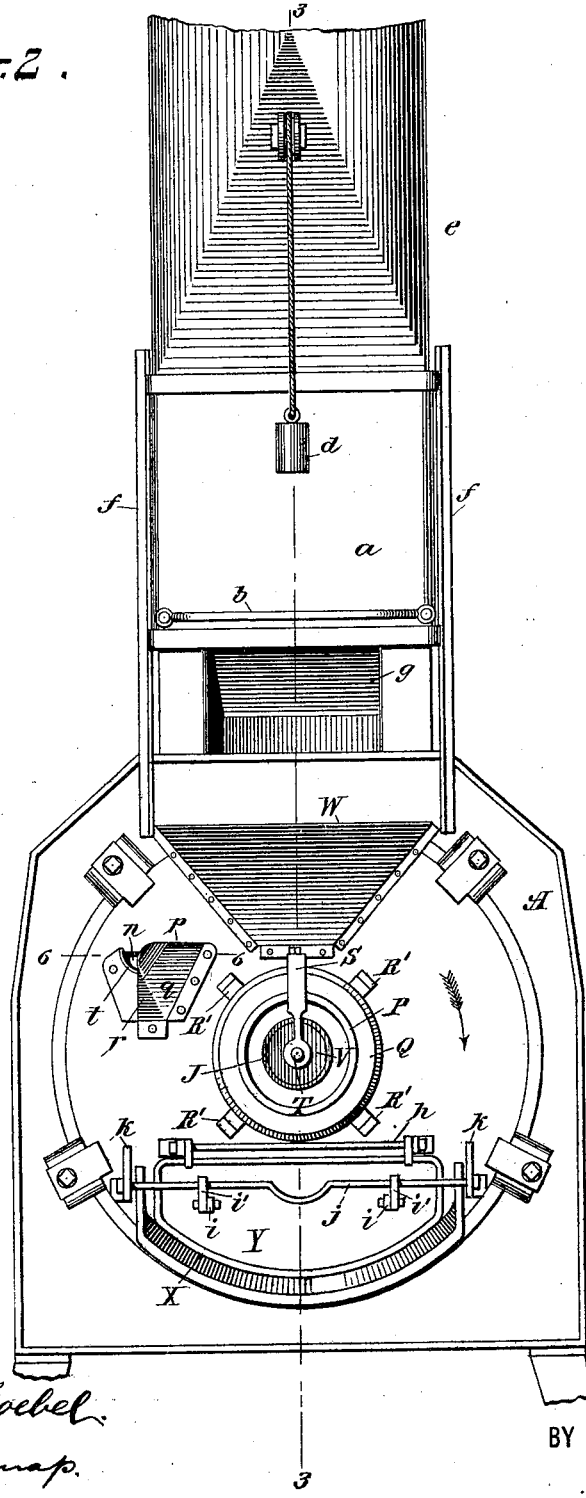

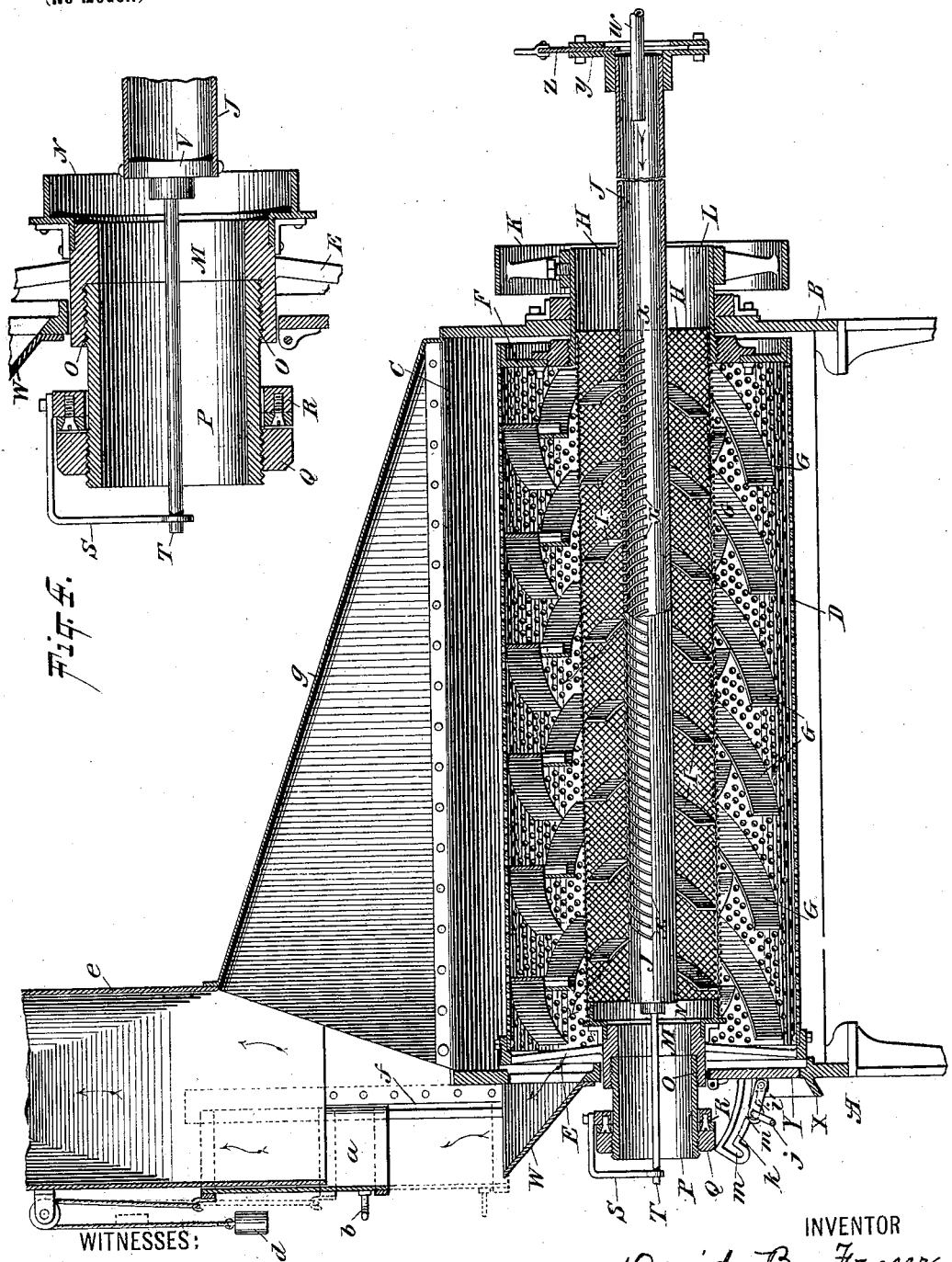

No. 627,993. Patented July 4, 1899.
D. B. FRASER.
COFFEE ROASTER.
(Application filed Apr. 22, 1898.)

(No Model.) 4 Sheets—Sheet 4.

WITNESSES:
William P. Goebel
E. Jos. Belknap

INVENTOR
David B. Fraser,
BY
Chas. C. Gill
ATTORNEY

UNITED STATES PATENT OFFICE.

DAVID B. FRASER, OF NEW YORK, N. Y.

COFFEE-ROASTER.

SPECIFICATION forming part of Letters Patent No. 627,993, dated July 4, 1899.

Application filed April 22, 1898. Serial No. 678,454. (No model.)

*To all whom it may concern:*

Be it known that I, DAVID B. FRASER, a subject of Her Majesty the Queen of Great Britain, and a resident of New York, in the county of New York and State of New York, have invented certain new and useful Improvements in Coffee-Roasters, of which the following is a specification.

The invention relates to improvements in coffee-roasters; and it consists in the novel features and combinations of parts hereinafter described, and particularly pointed out in the claims.

I have embodied the various features of the invention for convenience in the presentation of this application in a gas coffee-roaster, comprising an exterior casing, an inclosed perforated revoluble coffee-roasting cylinder, an inner cylinder, revoluble with said roasting-cylinder, and an elongated gas-burner extending longitudinally through the aforesaid inner cylinder and having slits cut into its upper part, the said slits being arranged on parallel lines with one another and at an angle to the transverse diameter of the burner. The exterior casing comprises the front and rear ends and opposite sides, an exit-flue at one end of the roaster, and an elevated dome or framing extending longitudinally over the top of the roaster and inclining upward from one end of the latter to the said exit-flue. The front end of the roaster is provided with an inlet hopper or chute for the coffee to be roasted and with a sliding door adapted when in its lower position to rest upon the edges of said chute or hopper and close the same and also form an extension of the exit-flue by which the said chute or hopper and the said flue are connected together. The said door is vertically slidable and when moved upward passes upward upon the sides and front of the exit-flue and leaves the inlet chute or hopper entirely open for the reception of the coffee to be roasted. The front end of the roaster is also provided with an outlet-doorway for the roasted coffee, and this doorway is supplied with a door equipped with means hereinafter described by which the door may be conveniently opened upward and retained in its open position. The perforated roasting-cylinder and the inner perforated cylinder surrounding the gas-burner are mounted to revolve together and are carried by suitable hollow cylindrical hubs or sections, which are entirely open at their outer ends, which extend through the ends of the roaster and freely admit the air to the inner cylinder. The inner cylinder is also preferably provided with agitator-blades in order that during its revoluble motion a constant agitation and circulation of air may be maintained around the gas-burner. The gas-burner is of novel construction in regard to the arrangement of the exit-slits therein, as above pointed out, and is provided at its inlet end with a suitable gate, damper, or valve for regulating the admission of air, with the gas, thereto.

The object of the invention is to produce a roaster employing gas and in which the coffee may be efficiently and quickly treated.

The nature of the invention and the details of the construction by which it may be carried into effect will be fully understood from the description hereinafter presented, reference being had to the accompanying drawings, in which—

Figure 5:
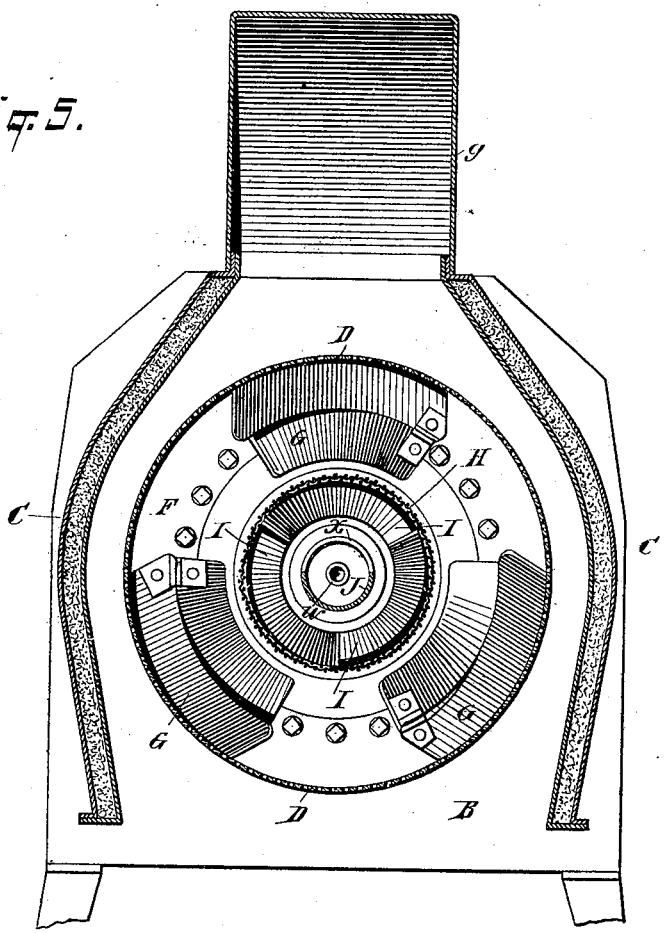
Figure 6:
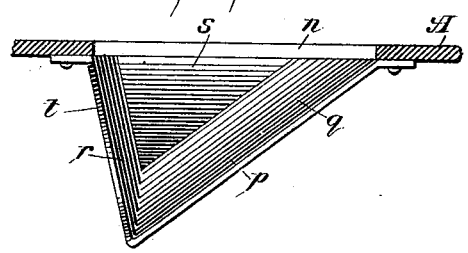

Figure 1 is a side elevation of a coffee-roaster constructed in accordance with and embodying the invention. Fig. 2 is a front elevation of same. Fig. 3 is a central vertical longitudinal section of same on the dotted line 3 3 of Fig. 2. Fig. 4 is a like section, on an enlarged scale, of a portion of same. Fig. 5 is a vertical transverse section of same on the dotted line 5 5 of Fig. 1, and Fig. 6 is an enlarged horizontal sectional view of a portion of same on the dotted line 6 6 of Fig. 2.

In the drawings, A B respectively denote the front and rear heads or ends of the general roaster, and C the sides of the roaster, said sides extending intermediate said heads A B. Between the sides C is mounted the roasting-cylinder D, which, as more clearly illustrated in Fig. 4, is formed of perforated sheet metal and secured at its ends upon the heads E F. The perforated cylinder D is provided along its inner surfaces with the blades G, of known construction and function, and centrally within said cylinder D is mounted the inner cylinder H, which is preferably formed of wire-cloth and is furnished over its inner surfaces with the series of blades I, which during the operation of the roaster create a constant agitation and circulation of air about the inner longitudinal pipe or burner J, the latter extending on a horizontal line centrally through the cylinder H.

The cylinders D H revolve together during the use of the roaster and have their revoluble motion imparted to them by a suitable belt connected with the band or power wheel K, which, as indicated in Fig. 3, is mounted upon the hollow hub L, which passes through the rear end B of the roaster and has mounted upon its inner edges the rear end or head F of the cylinder D. The rear end of the inner cylinder H is secured within the inner end of the hollow hub L, and hence both of the cylinders D H are secured to the inner end of the hub L and revolve with said hub. The hub L has its bearing in the end B of the roaster, and the belt-wheel K is rigidly secured to said hub.

The front end or head E of the cylinder D is in the nature of a spider, and its hub M (shown more clearly in Fig. 4) has secured to it the annular flange N, to which the front end of the cylinder H is secured. Thus the front end of the cylinder D and the front end of the cylinder H are secured together and will have a uniform motion under the action of the belt-wheel K. The hub M of the front head or spider E of the cylinder D has its bearing within the front head A of the roaster and has secured to it by means of screw-threads O the short cylindrical section P, upon whose outer end is applied by threading the annular shoulder or stop Q. Around, but not resting on, the cylindrical section P, at the rear side of the stop Q, is applied the collar or sleeve R, which is supported from the head A by brackets R' and to which, by means of the bent rod S, is connected the rod T, the latter extending inward through the cylindrical section P and hub M of the spider E and carrying at its inner end the plate V, snugly fitting within and closing the front end of the burner J, as more clearly illustrated in Fig. 4. The burner J has no revoluble motion, and hence the said burner is not connected with the cylinders D H. The rod T, bent rod or arm S, and collar R continue in stationary position and support the front end of the burner J, while the front head or spider E and cylindrical section P have their revoluble motion.

The coffee to be roasted is fed to the cylinder D and is kept from entering the inner cylinder H. The entrance for the coffee to the cylinder D is through the hopper or chute W and its exit from the cylinder D is through the doorway X, the latter being provided with the hinged door Y. (Shown more clearly in Fig. 2.) The hopper W is of usual outline, and above this hopper is the vertically-slidable door a, having a convenient handle b and being connected with the counterbalance-weight d, whose cord at one end is connected with the upper edge of said door a and thence passes over a pulley-wheel connected with the smoke-stack or exit-flue e, as shown in Figs. 2 and 3. The hopper W projects forward of the front head A of the roaster, and above the opposite sides of this hopper are provided the guides f, which take the extreme inner edges of the door a and guide the latter in its vertical movements from its lower position (shown by dotted lines in Fig. 3) to its upper position. (Shown by full lines in said figure.) The door a when in its lower position closes the space between the lower front edges of the flue e and the upper edges of the hopper W, and hence when in such position forms a means for directing the smoke and gases ascending from the cylinder D and hopper W into the exit-flue e. When the door a is in its upper position, (shown by full lines in Fig. 3,) it exposes the open upper end of the hopper W in order that the coffee to be roasted may be passed into said hopper and by it directed into the roasting-cylinder D.

The door a is composed of a flat front face, as shown in Fig. 2, and plain flat sides, as shown in Figs. 1 and 3, and the lower front portions of the flue e are conformed to the shape of the door a in order that said door may pass upward upon said flue during the opening of the hopper W for the reception of the coffee to be roasted. The door a when given the form and construction illustrated and arranged with due relation to the flue e, as shown in Figs. 1 and 3, constitutes a very desirable and convenient construction and one which does not mar the appearance of the roaster. When the door a is in its lower position, its front face is on a line with the outer front edge of the hopper W and the front surface of the exit-flue e, and hence said door presents no objectionable projecting parts, being harmonized with the general construction presented by the roaster.

Above the roasting-cylinder D the space between the sides C C is covered by the dome or framing g, which extends from the rear end of the roaster to the smoke-flue e, as clearly illustrated in Figs. 1 and 3. The dome or framing g extends over the entire length of the roaster and preferably is inclined from the flue e downward and rearward to the upper edges of the rear head B of the roaster, and said dome or framing g thus through an extended area at its front end directly opens into the lower portion of the flue e and serves to draw off the smoke and gases generated within the cylinder D. It is very desirable that the smoke and gases generated during the roasting of the coffee should not be confined with the coffee, but should be removed therefrom as rapidly and efficiently as possible, and with the construction presented in respect of the dome or framing g, flue e, and hood a I provide entirely efficient means for withdrawing from the roasted coffee the smoke and gases generated within the cylinder D. The length of the dome or framing g is clearly shown in Figs. 1 and 3 and the width of said framing is illustrated in Fig. 5, and from this figure it will be seen that the framing g constitutes a dome of extended area and capacity and that the smoke and gases generated within the cylinder D may be rapidly withdrawn therefrom and directed to the flue e.

It has been mentioned above that the exit for the coffee from the cylinder D is through the doorway X and that this doorway is provided with a door Y. The door Y and its connecting parts form a portion of the invention and are illustrated more clearly in Figs. 1, 2, and 3. The door Y is hinged at its upper edges upon a rod h and upon its front face carries lugs i i, in which are pivoted the links i' i', secured on the rod j, whose middle portion is fashioned into a handle, as shown in Fig. 2, and whose ends pass outward through frames k k, secured upon the front of the roaster. The frames k k are slotted to receive the ends of the hinged rod j and at their upper and lower ends are recessed, as at m, to form pockets for the reception of the ends of the rod j. When the door Y is to be opened, the attendant will grasp the middle portion of the rod j and through said rod turn the door Y upward upon its hinges. The upward movement of the door Y and rod j will result in the ends of said rod reaching the upper recesses m in the slotted frames k k, and the attendant will allow the ends of said rod to pass into said upper recesses m in order that said recesses may serve as a lock to engage the ends of said rod and hold the door Y open. When it is desired to close the door Y, the attendant will grasp the middle portion of the rod j and by slightly lifting said rod will free the ends of the latter from the upper recesses m, and thereupon the door of its own weight will automatically close, the ends of said rod j passing downward along the inclined slots of the frames k k until the lower ends of said slots have been reached, and at this time the ends of the rod j will be passed into the lower recesses m of said frames k k for the purpose of locking the door Y in its closed position. The hinged rod j, connected with the door Y, and the slotted and recessed guiding-frames k k, secured to the roaster, constitute a very desirable means for locking the door Y in both its open and closed positions, and at the same time the rod j serves as a convenient means by which the attendant may operate said door.

The front of the roaster is provided, as usual, with a try-hole n, through which a portion of the coffee may be withdrawn for the purpose of inspection. This try-hole n in the present instance is permanently open, and about it is secured the plate p, which is in the general form of a shield and is formed with flanges, by which it is secured to the front of the roaster, and also with the inclined side q, the very much less inclined side r, and the inclined middle portion s, the latter extending downward to the lower portion of the try-hole n.

The side r of the plate p has its upper edges removed, forming a recess t, as shown in Figs. 2 and 6, through which recess will be inserted the spoon or other device for withdrawing a portion of the coffee in order to determine its condition. The direction of motion in the cylinder D is such that any coffee passing through the try-hole n is directed against the longer inclined side q of the plate p, and said coffee is by said side q and middle portion s of said plate p directed back through the try-hole n into the cylinder D. The plate p is of such form that the try-hole n may always be left open, and hence it is at all times convenient to inspect the coffee within the roaster. The form of the plate p is such that the coffee will not be thrown out through the recess t, since the movement of the coffee is not against the side r of the plate p, but against the inclined side q of said plate.

The burner J constitutes an important part of the invention made the subject of this application, and said burner is in the nature of a pipe closed at its front end by the plate V and provided at its rear end with a suitable damper or gate, by which the admission of air to said pipe may be regulated at will. The pipe J is fed with gas from the smaller pipe w, (shown in Fig. 3,) and that portion of the pipe J constituting the burner proper and which is within the cylinder H is provided with the series of slots x, which are parallel with one another and close together and at an angle to the transverse diameter of the burner J, as shown more clearly in Fig. 3. The slots x pass through about the upper half of the pipe or burner J, and their arrangement at an angle to the transverse diameter of the burner J is of importance in that it enables me to obtain a greater area of opening in the burner J than would be possible if said slots x were directly across the burner J instead of on an angle to the transverse diameter thereof. The rear end of the pipe or burner J has mounted upon it a frame y to receive and guide an ordinary gate or damper z, by which the quantity of air entering the burner-pipe J may be regulated at will. This gate or valve z will be slotted to pass downward over the gas-pipe w.

The inner surfaces of the cylinder H are provided with the blades I, as above described, and during the revoluble motion of the cylinders D H said blades I create a constant agitation of air about the burner J and very greatly facilitate combustion and the proper roasting of the coffee.

The invention has been illustrated in a coffee roaster within which the coffee is roasted by heat generated from the burning of gas, and while I illustrate the preferred embodiment of the invention I do not limit all of the features of construction to the special gas-roaster shown, nor is the invention at all limited to the various blades provided within the cylinder D for acting upon the coffee.

The operation of the roaster will probably be understood from the description which has been given hereinbefore. In use the door $a$ is elevated and the coffee fed through the chute or hopper W to the roasting-cylinder D, and thereupon the door $a$ is lowered, the coffee being within the cylinder D and the gas being ignited at the slots $x$. The burner J having been ignited, the cylinders D H are set in motion by power applied to the belt-wheel K, and with proper attention the roasting is then carried on. The coffee during its process of being roasted may be inspected or tried from time to time through the try-hole $n$, and after the roasting has been completed the coffee will be withdrawn in the usual manner from the cylinder D through the doorway X, the door Y having been elevated and locked in its upper position for this purpose.

The framing or dome $g$ and the door $a$ and also the means for elevating and lowering and locking in its open and closed positions the door Y are applicable to roasters which do not belong to the gas-roaster class, and hence said features are not limited to a roaster employing a gas-burner J. The said features are, however, important and valuable parts of the gas-roaster shown and are claimed as a part of such roaster.

What I claim as my invention, and desire to secure by Letters Patent, is—

1. In a coffee-roaster, the outer sides C, C, the ends A, B, which are connected by said sides, the vertical exit-flue $e$ centrally above the front end of the roaster, and the framing or dome $g$ which extends lengthwise of the roaster and inclines downward from the side of said flue to the rear end of the roaster, said framing or dome $g$ being less in width than the width of the roaster and extending upward from the inwardly-extending upper ends of the sides C, C, combined with the roasting-cylinder extending lengthwise between said sides C, C, and below said framing or dome $g$, said framing or dome $g$ forming a means located longitudinally above the roaster proper to receive the smoke and gases arising from said cylinder and direct the same through the extended area of its upper end into the side of the said exit-flue $e$; substantially as set forth.

2. In a coffee-roaster, the front and rear ends, the opposite sides connecting said ends, and the vertical exit-flue $e$ extending upward centrally over the front end of the roaster, a portion of said flue being forward of the front face of the roaster and the remaining portion thereof being over the front portion of the roaster, combined with the hopper at the front end of the roaster, the vertically-slidable door $a$ conforming to the outline of the front and sides of said flue $e$ and fitting upon the same so as to be guided thereon, and the perforated roasting-cylinder mounted between said ends and adapted at one end to receive the coffee from said hopper, said door $a$ being adapted when in its lower position to form a continuance of the vertical front face and sides of said flue $e$ and to engage the upper edges of said hopper, whereby the gases and smoke which may ascend into said hopper from the roasting-cylinder are drawn directly upward into the said exit-flue on direct vertical lines; substantially as set forth.

3. In a coffee-roaster, the front and rear ends, the exterior sides, and the exit-flue, the said front end being provided at its upper part with the inlet-hopper, and at its lower part with the doorway for the escape of the roasted coffee, combined with the door Y for said doorway, the lugs $i, i$, upon the face of said door, the links $i', i'$, pivotally secured to said lugs $i, i$, the transverse rod $j$ secured to the outer ends of said links $i', i'$, the corresponding frames $k, k$, secured to the front of the roaster and slotted to receive and guide the ends of the said transverse rod $j$, the recesses $m$ formed at the upper ends of said frames $k, k$, to retain the ends of said rod $j$ and lock said door open, and the roasting-cylinder mounted between said front and rear ends and exterior sides and adapted to receive the coffee from said hopper and discharge the same through said doorway; substantially as set forth.

4. In a coffee-roaster, and front and rear ends, the exterior sides, and the exit-flue, the said front end being provided at its upper part with the inlet-hopper and at its lower part with the doorway for the escape of the roasted coffee, combined with the door Y for said doorway, the lugs $i, i$, on said door, the links $i', i'$, pivotally secured to said lugs, the transverse rod $j$ secured to the outer ends of said links $i', i'$, the rigid upwardly-extending corresponding guiding-frames $k, k$, secured to the front of the roaster and slotted to receive the ends of said rod $j$, the upper and lower recesses $m, m$, formed in said frames $k, k$, to retain the ends of said rod and lock said door in its open and closed positions, and the roasting-cylinder mounted between said front and rear ends and exterior sides and adapted to receive the coffee from said hopper and discharge the same through said doorway; substantially as set forth.

5. In a coffee-roaster, the exterior casing and exit-flue, combined with the roasting-cylinder, and the shield-plate $p$ over the try-hole $n$ in the front of the roaster, said plate $p$ having the inclined side $q$, the recessed side $r$, the side $s$, and the flanges by which it is secured to the roaster; substantially as set forth.

6. In a coffee-roaster, the exterior casing, the exit-flue, the inlet feed-hopper at the end of said casing, and the discharge-doorway at the lower portion of one end of said casing for the discharge of the roasted coffee, combined with the perforated revoluble roasting-cylinder mounted between the ends of said casing and adapted to receive the coffee from said inlet-hopper and to discharge the same through said doorway, the inner perforated revoluble cylinder from which the coffee is excluded, and the elongated gas-burner J extending horizontally through said inner perforated cylinder, said burner J being closed at one end and at the other end connected with the gas-pipe and provided with means for regulating the admission of air, the pipe J having its upper portion provided with the series of slots $x$ which are parallel with one another and close together and at an angle to the transverse diameter of the burner; substantially as set forth.

7. In a coffee-roaster, the exterior casing, and the exit-flue, combined with the perforated revoluble roasting-cylinder, the feed-hopper at one end of the roaster to feed the coffee to said cylinder, the doorway at the lower portion of one end of the roaster to permit the automatic discharge of the coffee from said cylinder, the inner perforated cylinder which excludes the coffee and is connected to revolve with said roasting-cylinder, the elongated gas-burner extending lengthwise within said inner perforated cylinder, and means for regulating the supply of air and gas to the inlet end of the said burner; substantially as set forth.

8. In a coffee-roaster, the exterior casing, the inlet-hopper at the upper portion of one end of said casing, the discharge-doorway at the lower portion of one end of said roaster, and the exit-flue, combined with the perforated revoluble roasting-cylinder within said casing, the inner perforated revoluble cylinder connected to revolve with said roasting-cylinder and open at both ends to receive the air at both ends of the roaster, the elongated gas-burner extending lengthwise within said inner cylinder and closed at one end, the gas-pipe less in diameter than said burner and supplying the latter with gas, and the gate for regulating the admission of air to the inlet end of said burner; substantially as set forth.

9. In a coffee-roaster, the exterior casing, the inlet-hopper at the upper portion of one end of said roaster, the discharge-doorway at the lower portion of the end of the roaster and the flue $x$ above said roaster, combined with the perforated revoluble roasting-cylinder, the hollow hub-sections M, L, upon which the ends of said roasting-cylinder are mounted and which have their bearing in the ends of the roaster and are open at their outer ends to admit air at both ends of the roaster, the inner perforated cylinder supported by said hollow hub-sections and open at both its ends to receive the air passing through said hollow hub-sections, and the elongated gas-burner extending lengthwise within said inner perforated cylinder and closed at one end, and at its other end connected with the gas-pipe of less diameter than the diameter of said burner, and provided with means for regulating the admission of air; substantially as set forth.

10. In a gas coffee-roaster, the combination of the perforated revoluble roasting-cylinder to receive the coffee to be roasted, the inner perforated cylinder from which the coffee is excluded and which is revoluble with said roasting-cylinder, the agitator-blades within said inner cylinder, and the elongated gas-burner within said inner cylinder; substantially as and for the purposes set forth.

Signed at New York, in the county of New York and State of New York, this 18th day of April, A. D. 1898.

DAVID B. FRASER.

Witnesses:
 CHAS. C. GILL,
 E. JAS. BELKNAP.